(12) United States Patent
Hughes

(10) Patent No.: US 6,841,753 B1
(45) Date of Patent: Jan. 11, 2005

(54) WELDING APPARATUS AND METHOD

(75) Inventor: Russell Vernon Hughes, Coventry (GB)

(73) Assignee: International Aluminium Holdings Limited (GB)

( * ) Notice: Subject to any disclaimer, the term of this patent is extended or adjusted under 35 U.S.C. 154(b) by 37 days.

(21) Appl. No.: 10/048,206

(22) PCT Filed: Jul. 28, 2000

(86) PCT No.: PCT/GB00/02920

§ 371 (c)(1),
(2), (4) Date: May 7, 2002

(87) PCT Pub. No.: WO01/10592

PCT Pub. Date: Feb. 15, 2001

(30) Foreign Application Priority Data

Aug. 6, 1999 (GB) .............................. 9918476
Oct. 15, 1999 (GB) .............................. 9924304

(51) Int. Cl.[7] .............................. B23K 9/12
(52) U.S. Cl. .............................. 219/121.46; 219/121.45
(58) Field of Search ...................... 219/121.46, 121.45, 219/121.64, 121.48, 121.54, 121.47, 121.66, 74, 137.7; 228/46, 50, 119, 232; 148/525, 514, 512, 651

(56) References Cited

U.S. PATENT DOCUMENTS 4,159,410 A  6/1979  Cooper
4,162,389 A * 7/1979 Shimdada et al. ..... 219/121.45
5,256,856 A * 10/1993 Takano et al. ...... 219/137 WM
5,449,107 A   9/1995 Umeno et al.
5,591,359 A   1/1997 Saitou et al.
5,599,469 A * 2/1997 Yoshino ................. 219/121.55
5,728,991 A * 3/1998 Takada et al. .......... 219/121.46
6,489,584 B1 * 12/2002 Kelly ..................... 219/121.46

FOREIGN PATENT DOCUMENTS

DE       35 35 212 A1    4/1987
EP       0 509 778 A2   10/1992
JP       58087118       12/1984
JP       58123622        1/1985
JP       11347742 A * 12/1999  ........... B23K/10/02
WO       WO99 03634      1/1999

OTHER PUBLICATIONS

International Search Report dated Nov. 16, 2000.

* cited by examiner

Primary Examiner—Quang T. Van
(74) Attorney, Agent, or Firm—Carlson, Gaskey & Olds

(57) ABSTRACT

A welding apparatus welds two or more overlapping members having a tenacious surface oxide layer. The apparatus includes a plasma arc torch operable to form a weld pool in a work piece and a weld pool disturbing device operable, in use, to disturb a weld pool formed by the plasma arc torch. The weld pool disturbing device includes a disturbing member which is movable into the weld pool. The apparatus may include a support member adapted to support the weld pool.

35 Claims, 3 Drawing Sheets

WELDING APPARATUS AND METHOD

BACKGROUND OF THE INVENTION

The present invention relates to welding and in particular to welding metals having a surface oxide layer such as, for example, aluminium alloy.

The high strength and low weight of aluminium alloy has traditionally lead to its use in areas where such factors are critical, for example in the aerospace industry. More recently it has begun to be used in the automotive industry as the material for vehicle bodies.

Difficulties exist in the welding of aluminium alloy due to its inherent nature. The high thermal conductivity of aluminium alloy ranges from three to five times that of steel, with the result that significantly higher inputs of energy are required to achieve fusion. For the welding of thick sections preheating of the work pieces may be necessary. Aluminium and its alloys have a surface film of aluminium oxide which forms rapidly when the aluminium is exposed to the atmosphere. It has been necessary to remove this oxide layer before welding as it prevents fusion between the work pieces. Oxide removal operations are time consuming and require a high degree of work piece cleanliness to be maintained if subsequent welding operations are to be successful. Magnesium and its alloys are also beginning to be considered for automotive applications. Like aluminium, magnesium also forms a surface oxide layer when exposed to the atmosphere.

These inherent problems with welding aluminium, magnesium and their alloys have thus far restricted their use in the automotive industry to top of the range vehicles and have necessitated the use of less desirable alternative joining methods such as riveting and adhesives.

SUMMARY OF THE INVENTION

According to a first aspect of the present invention there is provided a method of welding two or more overlapping members having a tenacious surface oxide layer, the method comprising the steps of:

melting said members at a predetermined location to form a weld pool; and disturbing the weld pool.

The step of disturbing of the weld pool enables sufficient mixing of the molten metal of the work pieces to ensure fusion therebetween. In particular, the step of disturbing the weld pool serves to break down any layer of oxide in the weld pool which, if left undisturbed, would prevent fusion.

In a preferred embodiment the step of melting the members to form the weld pool is achieved by a using a plasma arc torch. The method may include the step of clamping the overlapping members prior to forming the weld pool.

Disturbance of the weld pool may be achieved by introducing a disturbing member into the weld pool. In one embodiment the disturbing member may be consumable, for example a wire having a composition the same or similar to that of the metal forming the two or more members. In such an embodiment, the step of disturbing the weld pool may comprise the steps of advancing the disturbing member into the weld pool at a predetermined rate and to a predetermined depth and then withdrawing the disturbing member at a predetermined rate. The method may include the intermediate sup of holding the disturbing member in the weld pool for a predetermined time.

Preferably the speed of advance and withdrawal of the disturbing member is variable, and in a preferred embodiment the speed of withdrawal is equal to or faster than the speed of advances.

In an alternative embodiment the disturbing member may be non-consumable, for example a lance made from a material which is not wetted by the molten metal of the weld pool. The lance may be made from, for example platinum or a ceramic material. In such an alternative embodiment, the step of disturbing the weld pool may comprise the steps of advancing the lance into the weld pool at a predetermined rate and to a predetermined depth, and then withdrawing the lance. Again, the method may include the intermediate steps of holding the lance in the weld pool for a predetermined time.

Disturbance of the weld pool may be caused or promoted by the action of the plasma gas and/or the shielding gas. The gas way for example impinge on the weld pool at an angle in a manner so as to promote swirling. The plasma and/or shield gas may itself have a rotational component, for example introduced by rifling in a gas delivery jet.

The weld pool is preferably supported from beneath to avoid slumping. Such an arrangement is desirable in the case of single sided spot welding and has the additional advantage of providing control over the shape and appear ce of the solidified weld. It will however be understood that welding according to the method described herein. This latter aspect may be an important consideration in cases where the cosmetic appearance of the weld is important, or where a smooth surface finish is desirable.

In an alternative embodiment the support may be provided with a recess within which, in use, the weld pool is supported. The use of such a recess results in the face of the workpiece which rests there against during welding being provided with raised projections corresponding to the shape of the recess. In a run of multiple welds, the aforementioned face of the workpiece is thus provided with a repeated run of substantially identical projections. The recess may be configured so as to provide a aesthetically pleasing projection, for example a smooth dome. In an alternative embodiment the recess may be configured so as to provide a projection which is later utilisable to locate or align a component with respect to the workpiece.

If however, the weld is performed in carefully controlled conditions, a support may not be necessary. Precise regulation of the plasma gas and welding current can melt an upper layer of material whilst merely beating the lower layer. In this case the oxide layer may insulate the lower layer somewhat. As the weld pool of the upper layer is disturbed, the oxide layer is sufficiently disrupted to permit momentary melting of the lower layer, and formation of a unitary weld pool. Immediate reduction of current, plasma gas flow and/or cooling causes the weld to solidify without slumping.

In a preferred embodiment the movement of the disturbing member is at a relatively shallow angle to the plane of the weld, preferably above 30° and most preferably up to 45°.

The disturbing member is preferably introduced into the weld pool to one side thereof, thus promoting a stirring effect which more effectively promotes mixing in the weld pool. Two or more disturbing members may be provided to promote such stirring.

In a preferred embodiment a single sided spot weld between two strips of 5754 aluminium alloy required a plasma gas (Argon) flow rate of 1.5–1.8 liter per minute, and a disturbing member comprising a single filler wire of 5554 aluminium alloy and a diameter of 1.6 mm. Such a weld had a smooth appearance with an approximate overall diameter of 8 mm on the blind side and 10 mm on the front side.

Needless to say, a thinner wire would require a faster rate of feed and be more likely to buckle. A thicker wire might be more difficult to feed to the weld pool because of curvature of the feed path. Typically, in the above example, a feed speed of 4 m/min. and a withdrawal speed of 5 m/min are suitable. These factor are variable by the skilled man in order to obtain a optimum weld.

In the case of a supported weld pool, the oxide layer may be broken or disrupted by slumping the weld pool into a support recess of appropriate size. The oxide layer has no resilience, and consequently no resistance to deformation. Mixing may be promoted, by for example a swirling effect introduced by the plasma and/or shielding gas.

Pulsing of a welding current may also disturb the weld pool, for example by stepping an A.C. current up and down.

According to a second aspect of the present invention there is provided a welding apparatus comprising a plasma arc torch operable to form a weld pool in a work piece, and weld pool disturbing means operable, in use, to disturb a weld pool formed by the plasma arc torch. Optionally a weld pool supporting member may be provided.

The weld pool disturbing means preferably comprise a disturbing member which is movable into the weld pool. In one embodiment the disturbing member may be consumables and comprise a wire or filament having a composition the same or similar to that of the workpiece. In such an embodiment the wire or filament may be movable by a feed mechanism. The feed mechanism may be operable to move the wire or filament at one or more predetermined feed rates relative to the weld pool, in use. Preferably the feed mechanism includes guide means to guide the wire or filament to a predetermined location in the weld pool. In an alternative embodiment the disturbing means may be non-consumable, and comprise a lance or like implement. The lance is preferably be made from a material which is not wetted by the molten metal of the weld pool. More than one wire, filament or lance may be provided.

The support member comprises a support surface having a recess adapted to support the weld pool. In a preferred embodiment the support member is adapted to allow the recess to vent when the weld pool is formed. The support surface may be provided with one or more open channels extending from the recess. Preferably the support member is provided with a cooling system. The support member may have a substantially hollow interior through which coolant can be circulated.

The support member may have a peripheral raised edge against which the work piece is received. Such an edge, which may be discontinuous, reduces conduction of heat from the work piece to the support, and allows a relatively easily adjustable means of varying the beat transfer characteristics of the weld. The raising of the edge may be very small, and in the order of 0.05 mm.

In an alternative embodiment the support member may comprise a body having an insert, the insert defining the support surface, wherein the insert is manufactured from a material having a lower thermal conductivity than the material of the body. The use of such an insert reduces the amount of beat energy transferred to the support during welding and hence reduces the energy input required from the plasma torch. The insert may be manufactured from a ceramics material, for example reaction bonded silicon nitride. Alternatively the insert may be manufactured from an electrically conductive material, for example a graphite based material.

The plasma arc torch and support member may be movable relative to one another so as to enable the work piece to be clamped therebetween.

In a preferred embodiment, an electric welding current may be pulsed during welding in order to disturb the oxide layer and/or to regulate the heat input to the weld. Such an arrangement may be especially useful in avoiding slumping of non-horizontal welds.

BRIEF DESCRIPTION OF THE DRAWINGS

An embodiment of the present invention will now be described with reference to the accompanying drawings in which.

DETAILED DESCRIPTION OF A PREFERRED EMBODIMENT

Figure 1:
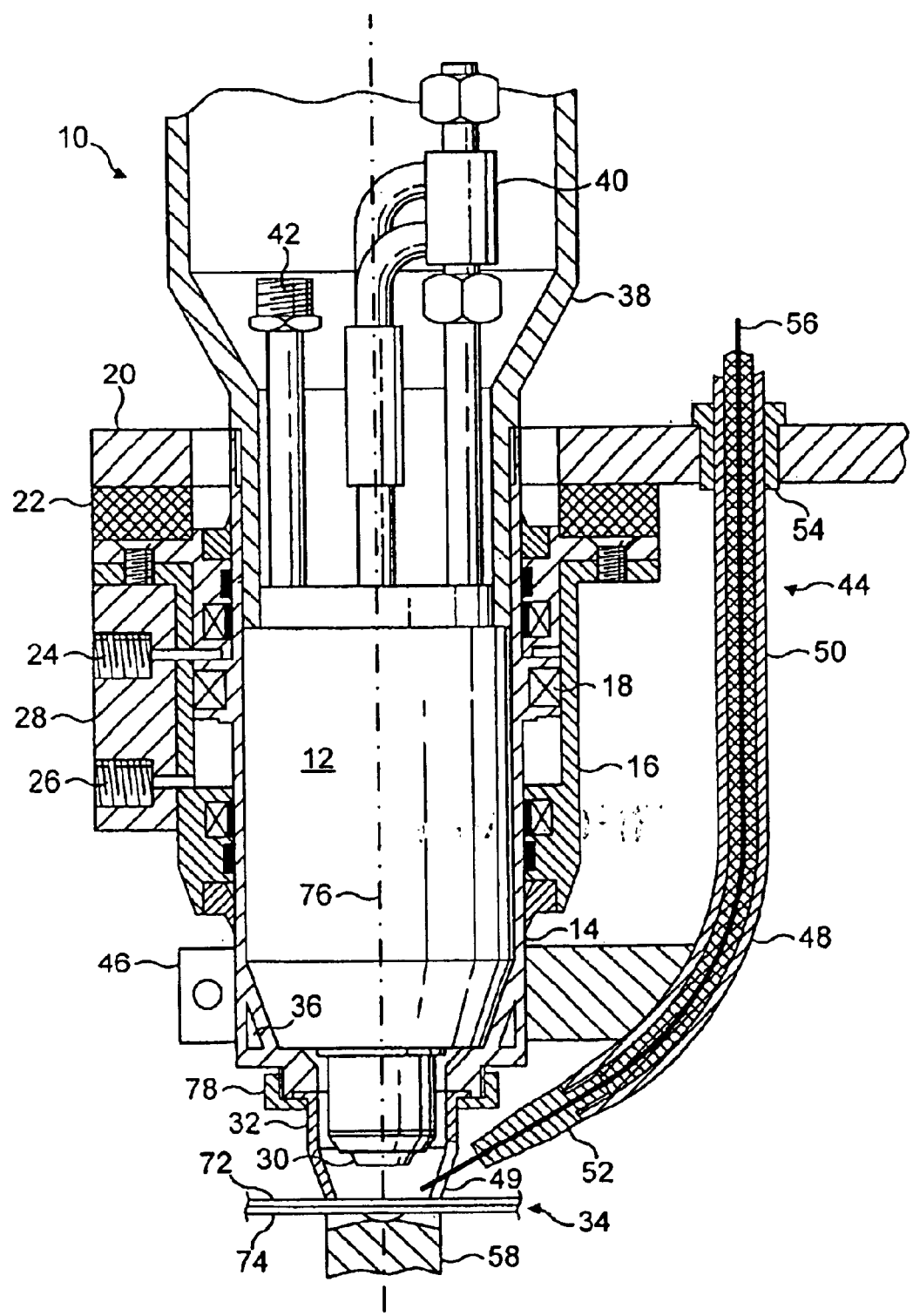
FIG. 1 shows cross-sectional side view of a welding apparatus in accordance with the present invention.

Referring firstly to FIG. 1 there is shown a welding apparatus, generally designated 10, adapted to produce spot welts. The welding apparatus comprises a plasma arc welding torch 12 mounted on a movable carriage 14. The carriage 14 is movable within a cylinder 16, and an outer portion of the carriage 14 carries a peripheral seal 18 which enables the carriage 14 to act as a piston. The cylinder 16 is connected to a mounting bracket 20 via a vibration absorbent compliance ring 22. The carriage 14 is movable relative to the cylinder 16 by the selective application of fluidic pressure, for example pneumatic pressure, to the cylinder 16 via apertures 24,26 provided in the wall thereof. As can be readily seen, the apertures 24,26 are provided above and below the peripheral seal 18. A porting block 28 is provided adjacent the apertures 24,26 to enable connection of a suitable source of fluidic pressure.

The constrict orifice 30 of the plasma torch 12 projects from the carriage 14 and is shrouded by a clamp cup 32 carried by the carriage 14. The clamp cup 32 is connected to the carriage 14 by a retaining ring 78. The clamp cup 32 serves, in use, both to clamp a work piece 34 and to ensure adequate gas shielding of the weld site. Both functions of the clamp cup 32 will be described in more detail below. The carriage 14 is provided with cooling channels 36 to allow the circulation of coolant to cool the plasma torch 12 when it is in operation. The plasma torch 12 is retained in the carriage 14 by a tubular retaining sheath 38. The sheath 38 also houses the gas and power connections 40,42 of the plasma torch 12.

A filler wire guide, generally designated 44, is connected to the carriage 14 by a support clamp 46. The wire guide 44 comprises a curved guide tube 48 containing a liner 50, and a tapered tip 52. In the embodiment shown the guide tube 48 passes through the mounting bracket 20. As guide tube 48 is connected to the movable carriage 14 by the support clamp 46, an insulated guide bush 54 is provided in the mounting bracket 20 to allow relative movement of the guide tube 48. Filler wire 56 is movable through the wire guide 44 by an appropriate feed mechanism (not shown). Typically the filler wire is stored in the feed mechanism on a drum. The tip 52 of wire guide 44 is positioned so as to, in use, feed the filler wire 56 through an aperture 49 in the clamp cup 32.

Figure 3:
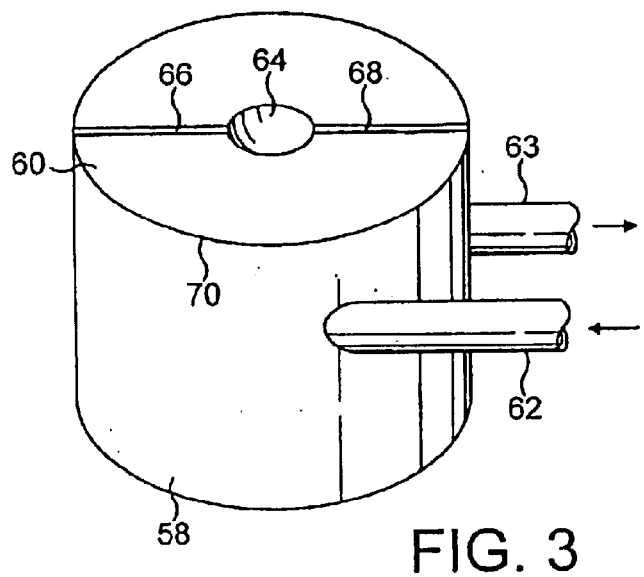
FIG. 3 shows a perspective view of a support member according to the present invention.

A support member 58 is shown in FIG. 1 and also in greater detail in FIG. 3. The support member 58 has a support surface 60 against which the work piece 34 rests in use. The support member 58 has a substantially hollow interior into which coolant can be circulated via an inlet 62 and an outlet 63. A recess 64 is provided in the support surface 60 and two channels 66,68 send in opposite directions from the recess 64 to the edge 70 of the support surface 60.

Operation of the welding apparatus 10 will now be described with reference to all of the figures. In the embodiment shown the workpiece 34 comprises two overlapping sheets 72,74 of aluminium alloy. The sheets 72,74 are positioned such that the intended position of the weld is aligned with a nominal iso 76 passing through the plasma torch 12 and the recess 64 in the support member 58 as shown in FIG. 1. The carriage 14 is lowered until the clamp cup 32 abuts the work piece 34, and the work piece 34 is clamped against the support member 58. This clamping action reduces the possibility of the sheets 72,74 moving relative to one another during the subsequent welding operation.

Figure 2A:
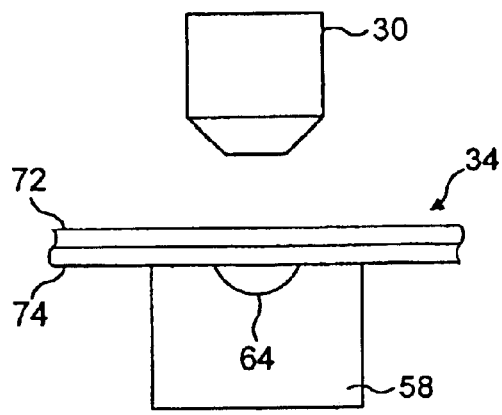
FIGS. 2a to 2c show diagrammatic side view of a welding operation according to the, present invention.
Figure 2B:
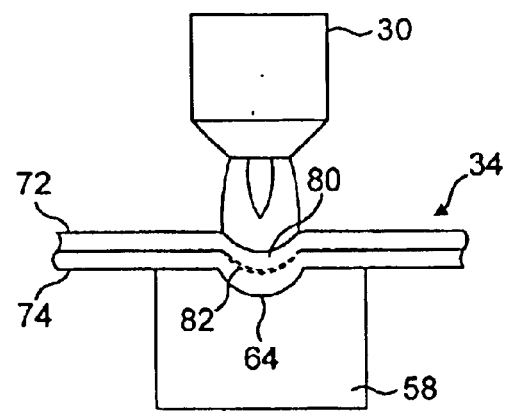

The welding torch 12 is then operated to produce localised melting of the work piece 34 to form a weld pool 80. The weld pool 80 is contained by the recess 64 of the support member 58 as shown in FIG. 2b. As the weld pool 80 forms, air present in the recess 64, which expands due to the heating of the work piece 34, vents via the channels 66,68. Without the channels 66,68, the only means of escape for the expanding air would be through the molten weld pool 80 which could result in the weld pool 80 being blown from the recess 64. The channels 66,68 also provide a means of escape for surface coatings present on the lower surface of the workpiece 34, which coatings liquefy as a result of the formation of the weld pool 80. For example the work piece 34 may be provided with a protective surface coating of wax.

Figure 2C:
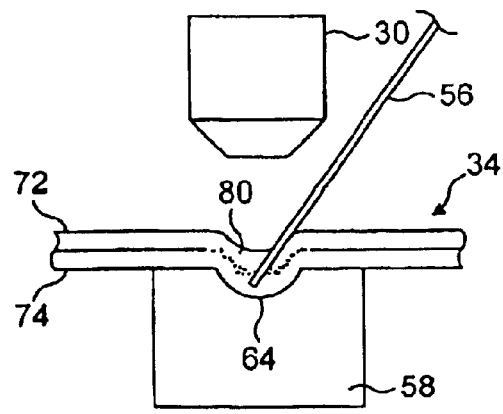

Once the weld pool 80 has formed, there remain thin lays of aluminium oxide, shown by broken lines 82 in FIG. 2b, between the molten metal of the respective sheets 72.74. These oxide layers 82 comprises the oxide present on the facing surfaces of each sheet 72,74. This prevents the mixing of the molten metal of the sheets 72,74, and hence prevents fusion. To overcome this, filler wire 56 is advanced into the weld pool 80 to disturb the oxide layers 82 as shown in FIG. 2c. Once the oxide layers 82 are penetrated by the filler wire 56, convective forces within the weld pool 80 ensure sufficient mixing of the molten sheet metal to achieve fusion. The filler wire 56 typically has a composition which is the same as that of the alloy sheets 72,74, for example a mixture of aluminium and magnesium or silicon. Once the filler wire 56 has been advanced into the weld pool 80, it is held there for a predetermined time to allow a portion thereof to melt and become incorporated in the weld. After said predetermined time has elapsed, the filler wire 56 is retracted. The work piece 34 can then be unclamped and removed from the apparatus 10.

Figure 4:
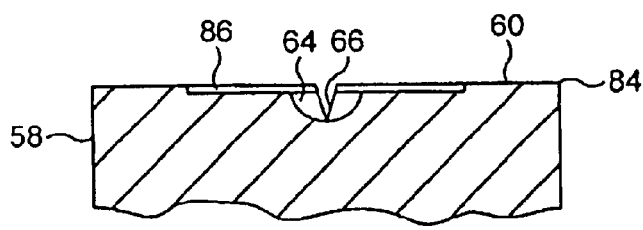
FIG. 4 shows a cross-sectional side view of a first alternative support member.

FIG. 4 shows an alternative support member 58 having a peripheral raised edge 84 which defines a substantially annular support surface 60.

The recess 64 within which the weld pool is supported in use, is provided in the middle of the annular support surface 60. In use, the raised edge 84 enables an air gap 86 to be provided between the support member 58 and the workpiece 34 in the vicinity of the weld site. The air gap 86 reduces the transfer of heat from the workpiece 34 to the support member 58 during welding.

Figure 5:
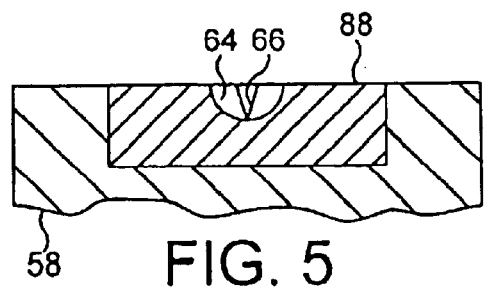
FIG. 5 shows a cross-sectional side view of a second alternative support member.

FIG. 5 shows a further support member 58 having an insert 88 therein. The insert 88 is configured so as to define the above described recess 64 and vent channels 66. The insert is manufactured from a material having a lower thermal conductivity than that of the main body of the support member 58. The insert may be a high temperature non-metallic material which, in use, is not wetted by the molten metal of the weld pool. The insert may be a ceramic material such as, for example, reaction bonded silicon nitride.

The use of an insert of a material having a lower thermal conductivity advantageously may eliminate the need for the support member 58 to be cooled as less heat energy is transferred thereto during welding. It will be appreciated that heat energy transferred to the support 58 is, in effect, wasted as it is not used in the heating of the workpiece and the formation of the weld pool. Thus by reducing the energy transfer to the support 58 there is a consequential reduction in the energy needed to achieve a weld. Taking the example of welding two overlapping aluminium alloy sheets each having a thickness of 1 mm and utilising a water cooled copper support has been observed to require a welding current of around 150 amps for a duration of about 3 seconds. In contrast, by substituting an uncooled copper support having a ceric insert a similar weld could be achieved using a welding current of around 105 amps for a duration of about 2 seconds.

Alternatively the insert may be manufactured from an electrically conductive material having a lower thermal conductivity than the main body of the support 58. Such an insert ensures that the support in its entirety is electrically conductive and thus eliminates the possibility that the electrical circuit formed, in use between the workpiece and the plasma torch maybe broken during welding.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method of welding comprising the steps of:
   overlapping a plurality of members having a tenacious surface oxide layer;
   melting the plurality of members at a predetermined location to form a weld pool; and
   disturbing the weld pool by introducing a disturbing member into the weld pool.

2. The method as claimed in claim 1, wherein the step of melting the plurality of members to form the weld pool is achieved by a using a plasma arc torch.

3. The method as claimed in claim 2, wherein the step of disturbing the weld pool includes disturbance by pulsing a welding current of the plasma arc torch.

4. The method as claimed in claim 1, further including the step of clamping the plurality of members prior to forming the weld pool.

5. The method as claimed in claim 1, wherein the disturbing member is consumable.

6. The method as claimed in claim 5, wherein the disturbing member has a composition substantially similar to the metal forming the plurality of members.

7. The method as claimed in claim 1, wherein the disturbing member is non-consumable.

8. The method as claimed in claim 1, wherein movement of the disturbing member is at a relatively shallow angle relating to a plane of the weld pool.

9. The method as claimed in claim 8, wherein the angle is greater than 30°.

10. The method as claimed in claim 9, wherein the angle is less than 45°.

11. The method as claimed in claim 1, wherein the disturbing member is introduced into the weld pool to one side thereof to promote a stirring effect.

12. The method as claimed in claim 1, wherein the step of disturbing the weld pool includes employing by a welding gas.

13. The method as claimed in claim 12, wherein the welding gas impinges on the weld pool at an angle and in a manner to promote swirling of the weld pool.

14. The method as claimed in claim 1, wherein the weld pool is supported from beneath.

15. The method as recited in claim 1, wherein the step of overlapping occurs before the step of melting.

16. The method as recited in claim 1, wherein the step of disturbing breaks the tenacious surface oxide layer.

17. A method of welding comprising the steps of:
   overlapping a plurality of members having a tenacious surface oxide layer;
   melting the plurality of members at a predetermined location to form a weld pool; and
   disturbing the weld pool by introducing a disturbing member into the weld pool by advancing the disturbing member into the weld pool at a speed of advance and to a predetermined depth, and then withdrawing the disturbing member at a speed of withdrawal.

18. The method as claimed in claim 17, further including the step of holding the disturbing member in the weld pool for a predetermined time.

19. The method as claimed in claim 17, wherein the speed of advance and the speed of withdrawal of the disturbing member are variable.

20. The method as claimed in claim 17, wherein the speed of withdrawal is at least equal to the speed of advance.

21. A welding apparatus comprising:
   a plurality of overlapping members having a tenacious surface oxide layer;
   a plasma arc torch operable to form a weld pool in a work piece;
   a weld pool disturber including a disturbing member which is movable into the weld pool to a depth sufficient to penetrate the tenacious surface oxide layer present in the weld pool; and
   a weld pool.

22. The apparatus as claimed in claim 21, wherein the disturbing member is consumable.

23. The apparatus as claimed in claim 22, wherein the disturbing member includes a wire having a composition substantially similar to the work piece.

24. The apparatus as claimed in claim 23, wherein the wire is movable by a feed mechanism.

25. The apparatus as claimed in claim 24, wherein the feed mechanism moves the wire at a predetermined feed rate relative to the weld pool.

26. The apparatus as claimed in claim 24, wherein the feed mechanism includes a guide feature to guide the wire to a predetermined location in the weld pool.

27. The apparatus as claimed in claim 21, wherein the disturbing member is non-consumable.

28. The apparatus as claimed in claim 21, wherein the weld pool support includes a support surface having a recess to support the weld pool.

29. The apparatus as claimed in claim 28, wherein the weld pool support allows the recess to vent when the weld pool is formed.

30. The apparatus as claimed in claim 21, wherein the weld pool support includes a body having an insert, wherein the insert is manufactured from an insert material having a lower thermal conductivity than a body material of the body.

31. The apparatus as claimed in claim 21, wherein the weld pool support is provided with a cooling system.

32. The apparatus as claimed in claim 21, wherein the weld pool support has a peripheral raised edge against which the work piece is received.

33. The apparatus as claimed in claim 21, wherein the plasma arc torch and the weld pool support are movable relative to one another to enable the work piece to be clamped therebetween.

34. The apparatus as claimed in claim 21, wherein an electric welding current of the plasma arc torch pulses during welding to assist disturbance of the tenacious surface oxide layer.

35. The apparatus as recited in claim 21, wherein the disturbing member breaks the tenacious surface oxide layer.

* * * * *

UNITED STATES PATENT AND TRADEMARK OFFICE
CERTIFICATE OF CORRECTION

PATENT NO.   : 6,841,753 B1
DATED        : January 11, 2005
INVENTOR(S)  : Hughes It is certified that error appears in the above-identified patent and that said Letters Patent is hereby corrected as shown below:

Column 8,
Line 5, please insert -- support -- after "pool".

Signed and Sealed this

Tenth Day of May, 2005

JON W. DUDAS
*Director of the United States Patent and Trademark Office*